United States Patent [19]

Escher et al.

[11] 4,235,009

[45] Nov. 25, 1980

[54] ENCAPSULATING SOLID TANTALUM CAPACITORS

[75] Inventors: Balint Escher, Ableiges; René Romanet, Meulan, both of France

[73] Assignee: Societe Lignes Telegraphiques et Telephoniques, Paris, France

[21] Appl. No.: 893,999

[22] Filed: Apr. 6, 1978

[30] Foreign Application Priority Data

Apr. 15, 1977 [FR] France ................................. 77 11393

[51] Int. Cl.³ .............................................. B01J 17/00
[52] U.S. Cl. ........................................ 29/570; 29/585; 29/588; 264/22; 264/25; 264/272
[58] Field of Search ................. 29/570, 584, 585, 586, 29/588; 264/22, 27, 274

[56] References Cited

U.S. PATENT DOCUMENTS

| | | | |
|---|---|---|---|
| 3,653,119 | 4/1972 | Fresia | 29/585 |
| 4,035,905 | 7/1977 | Clement | 29/570 |
| 4,079,503 | 3/1978 | Schnabel | 29/570 |

*Primary Examiner*—W. C. Tupman
*Attorney, Agent, or Firm*—Carroll F. Palmer

[57] ABSTRACT

Powdered plastic encapsulation of solid tantalum capacitors is achieved through coating the capacitors between 150° C. and 250° C. while biasing the capacitors at direct voltage between 0.2 and 1 times the rated voltage. The plastic is cured in about 3 minutes. The capacity temperature derating and the reverse current temperature derating are reduced with respect to capacitors encapsulated unbiased at the same temperature.

3 Claims, 3 Drawing Figures

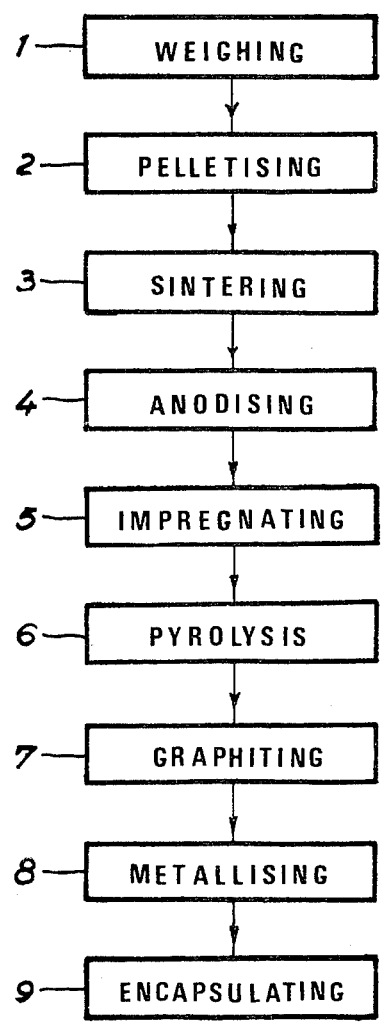
Fig: 2

ENCAPSULATING SOLID TANTALUM CAPACITORS

BACKGROUND OF THE INVENTION

The present invention relates to an improvement in the manufacture of solid-electrolyte tantalum capacitors and is concerned more particularly with encapsulation. It is necessary to recall here the principal stages in the manufacture of tantalum capacitors such as have been described in the French Pat. No. 1,091,097 applied for by Western Electric on Nov. 25, 1953.

The anode is produced essentially from tantalum powder having well-defined grain size, by pressing followed by sintering at temperatures which depend upon the required performances of the capacitor and which are in the neighbourhood of 1800° C. By means of this metallurgical treatment, a porous anodic structure is obtained, which is thereafter subjected to an anodization for the purpose of forming over the whole of the surface of the anodic sponge a layer of tantalum oxide which performs the function of the dielectric of the capacitor. The oxidised anodic structure is thereafter covered by a layer of manganese dioxide (the cathode) obtained by impregnation of the porous structure with a solution of a manganese salt which decomposes into dioxide by pyrolysis. The pyrolysis step sometimes deteriorates the oxide layer, which must be subsequently reformed. In order to obtain a dioxide layer of sufficient thickness, it is also usual to proceed with a number of successive impregnations, followed by pyrolyses and reformations. The cathode connection of the capacitor is thereafter formed by depositing a number of conductive layers on the structure thus obtained. When provided with lead wires, the capacitor is completed by an encapsulation step.

The use of metallic casings to protect the capacitors from the environment leads to high cost components.

More economical processes have been developed, in which powdered plastic materials are used to coat the components by the application of processes such as transfer moulding, fluidisided beds, etc. These processes involve bringing the component which is to be coated to a sufficient temperature to ensure thermosetting of the pulverulent plastic material with a view to obtaining a continuous flim having appropriate mechanical properties coating the component. Suitable plastic materials which are at present available polymerise at temperatures above 150° C., the reaction speed increasing with the temperature. It is therefore desirable, from the industrial point of view to carry out this step in the upper temperature range, for example between 200° and 250° in the case of epoxy powders. Polymerisation at high temperature also affords greater reliability due to better continuity of the film. However, it is known that heating of the capacitor at a temperature of the order of 200° to 250° C. spoils the characteristics of the capacitor. On curve A of FIG. 1 the values of the relative capacitance variation between 25° C. and 85° C. as a function of the temperature at which the capacitors have been heated in the course of the encapsulation are plotted. This variation is considerable at temperatures above 200° C. In order to avoid this disadvantage, it has been usual to thermoset the plastic material at lower temperatures and therefore for a longer time and with a risk of incomplete reaction.

BRIEF SUMMARY OF THE INVENTION

According to the invention the improved process for encapsulating capacitors with a film of thermosetting plastic material consists in that the capacitor is maintained under voltage throughout the period of coating and at a temperature between 150° and 250° C. for the purpose of curing the same. The direct votage applied to the capacitor is preferably between 0.2 Un and Un, where Un is the rated operating voltage.

BRIEF DESCRIPTION OF THE FIGURES

The invention will be more readily understood from the following description and the accompanying figures, which are given by way of non-limiting illustration of the invention, and in which:

FIG. 2 is the block diagram of the successive steps in the manufacture of a capacitor according to the invention.

DETAILED DESCRIPTION

Figure 1:
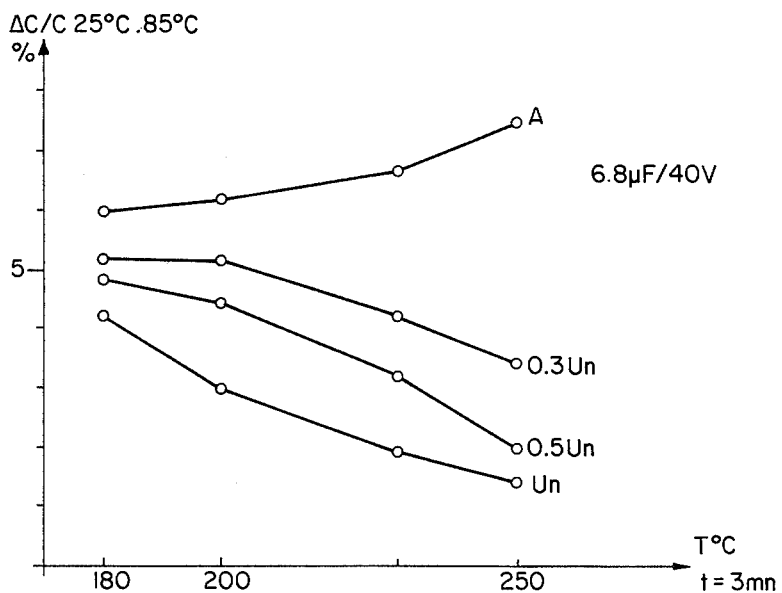
FIG. 1 illustrates the capacitance variation between 25° C. and 85° C. of capacitors produced in accordance with the prior art (curve A) with respect to encapsulation temperature and in accordance with the invention for various values of the voltage applied during thermosetting in the same encapsulation temperature range.

Curve A of FIG. 1, already referred to shows the relative variation of the capacitance of capacitors (rated value of 6.8 $\mu$F operating at 40 V) between 25° and 85° C. as a function of the temperature to which the capacitor is maintained during the coating process with plastic powdered material. The operation lasts three minutes. It will be seen that the relative capacitance variation increases notably when the temperature increases. The other curves in FIG. 1 represent the variation of capacitance in the same temperature range, for capacitors produced in the same way as those characterized by curve A, except for the encapsulation step during which the capacitor is maintained at the forward voltage value indicated in the figure. It will be seen that the relative capacitance variations decrease when the value of the applied voltage increases. When curing the coating at 230° C., the relative capacitance variation decreases from 6.2% to 2% when the voltage applied during the encapsulation is equal to Un.

FIG. 2 diagrammatically shows the various steps of manufacture of solid-electrolyte capacitors. They consist in weighing of the tantalum powder 1, which has optionally undergone a pregranulating step, followed by a pressing or pelletising (step 2) completed by a sintering (step 3) which, in some cases, is divided into a presintering step followed by a sintering step. The anode is then anodized (step 4), so as to form the dielectric consisting essentially of tantalum pentoxide. There then follows the impregnation 5 of the anodes with a solution of a manganese salt decomposed into manganese dioxide in the course of the pyrolysis step 6. Steps 4, 5 and 6 are generally repeated a number of times in the same order. The manganese dioxide is thereafter coated with a layer of conductive graphite (step 7) and there is deposited thereon a metal layer consisting of silver in the description given in the aforesaid patent. It is now often preferred to effect a deposition of copper by means of a plasma (step 8) in accordance with a technique well-known per se, in place of the silver deposition, because the cathode connection thus obtained has higher temperature stability. From the electrical viewpoint, the capacitor is finished, the anode connection generally being produced with the anode by immersing a lead in the powder before sintering and electrically welding it to a nickel wire. The capacitor is mechanically completed by an encapsulation (step 9).

It is usual to encapsulate the completed capacitor by placing plastic powder which is thermosettable on the capacitor so as to form a film coating the capacitor intended to protect it mechanically against the environment. The capacitor is maintained at a temperature between 150° C. and 250° C. during this operation, the duration of which depends upon the temperature, as is known. Curve A of FIG. 1 shows that the selection of the upper temperatures during thermosetting is undesirable from the viewpoint of performance, although being desirable from the industrial viewpoint since it reduces the duration of the operation. The other curves of FIG. 1 show that it is possible, at a preset polymerisation temperature, for example 250° C., to reduce the relative capacitance variation from 7.5% to 1.5% by applying a forward voltage equal to the rated operating value to the capacitor during encapsulation.

Figure 3:
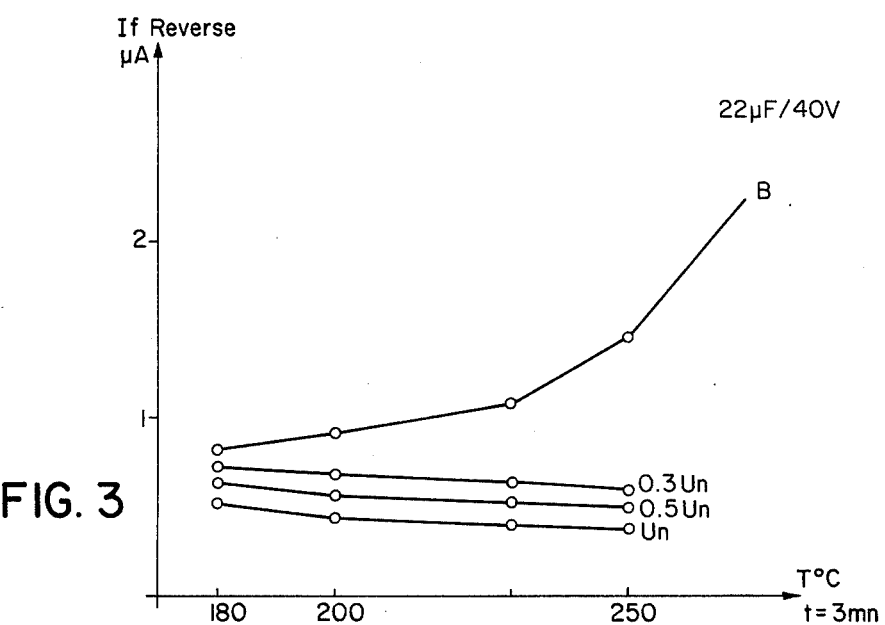
FIG. 3 illustrates the variation of the reverse current with the temperature of encapsulation for various values of the voltage applied in the course of the encapsulation step.

The curves of FIG. 3 represent the variations of the reverse leakage current of 22 μF capacitors rated at Un=40 V when operated at a reverse voltage of 0.2 Un, as a function of the encapsulation temperature. Curve B corresponds to a capacitor produced in accordance with the prior art from a mixture of pure tantalum powders and tantalum powder containing 20,000 ppm of molybdenum, as described in French Pat. No. 2,218,633 filed by the Assignor on Feb. 19, 1973. The other curves of FIG. 3 represent the variations of the leakage current of capacitors of the same type, produced through exactly the same process except for step 9 (encapsulation) which, in accordance with the invention, takes place while the capacitor is maintained at a voltage value shown in the figure. It will be clearly seen that the reverse current values vary very little as a function of temperature when encapsulation takes place under voltage, and that the value of this voltage has little effect on the value of the reverse current. In the case of capacitors produced in accordance with the prior art (curve B) there is noted an appreciable increase in the reverse leakage current when the capacitor has been brought to a temperature above 200° C. for curing the encapsulant. It will be seen that the reverse current of the capacitors of which the encapsulation has been carried out under an applied voltage equal to the rated value Un at even a higher temperature (250° C.) has a reverse current about one-half of that of capacitors whose encapsulation has been carried out without applied voltage. The method of application of the powder intended to constitute the coating has no effect on the performances obtained and the same improvement is noted as long as encapsulation is carried out under applied voltage. The nature of the powder, which fixes the setting temperature, has no influence either on the performance of the capacitor.

What we claim:

1. Process for encapsulating solid-electrolyte tantalum capacitors with thermosettable powdered plastic material which consists in:
   heating said capacitors to a temperature between about 150° and 250° C.,
   coating said capacitors while they are so heated with said plastic material to completely encapsulate them,
   simultaneously with said heating and coating direct biasing said capacitors at 0.2 to 1 times the rated voltage of said capacitors,
   maintaining both said bias voltage and heating for a few minutes sufficient to thermoset said plastic material, and
   completing the process of manufacture of said capacitors by cutting off said bias voltage and said heating.

2. The process of claim 1 wherein said plastic material is an epoxy resin, and said heating, coating and voltage biasing are performed for about three minutes.

3. The process of claim 1 wherein said plastic material is an epoxy resin, said temperature is between about 200° and 250° C. and said few minutes is about three minutes.

* * * * *